United States Patent [19]

Meltsch et al.

[11] Patent Number: 4,825,016
[45] Date of Patent: Apr. 25, 1989

[54] FLAME-RESISTANT CABLE SLEEVE

[75] Inventors: Hans-Jurgen Meltsch, Hagen; Jan Rost, Traubing; Albin Behmer; Ernst Mahler, both of Lichtenfels, all of Fed. Rep. of Germany

[73] Assignee: Siemens Aktiengesellschaft, Munich, Fed. Rep. of Germany

[21] Appl. No.: 826,090

[22] Filed: Feb. 4, 1986

[30] Foreign Application Priority Data

Feb. 4, 1985 [DE] Fed. Rep. of Germany ....... 3503732

[51] Int. Cl.$^4$ ......................................... H02G 15/113
[52] U.S. Cl. .......................................... 174/93; 174/92; 138/139; 138/151
[58] Field of Search ............ 174/92, 93, 84 R, 106 R, 174/28; 138/137, 138, 139, 151, 164

[56] References Cited

U.S. PATENT DOCUMENTS

| 2,514,905 | 7/1950 | Solero | 138/138 |
| 3,342,929 | 9/1967 | Kleinfelder et al. | 174/93 |
| 3,636,240 | 1/1972 | Quante et al. | 174/92 |
| 4,169,966 | 10/1979 | Casati | 174/92 |
| 4,198,173 | 4/1980 | Zehren | 174/84 R |
| 4,237,335 | 12/1980 | Giebel et al. | 174/92 |
| 4,262,168 | 4/1981 | Bossard | 174/92 X |
| 4,289,553 | 9/1981 | Nolf | 174/84 R X |
| 4,509,559 | 4/1985 | Cheetham et al. | 138/137 X |

FOREIGN PATENT DOCUMENTS

| 1540216 | 1/1970 | Fed. Rep. of Germany | 174/92 |
| 3319120 | 11/1984 | Fed. Rep. of Germany | 174/92 |
| 7508247 | 7/1975 | Netherlands | 174/92 |

Primary Examiner—Morris H. Nimmo
Attorney, Agent, or Firm—Kenyon & Kenyon

[57] ABSTRACT

A flame-resistant cable sleeve for power and communication, transmission cables which has a metallic multilayer non-inflammable, flexible metallic enclosure. Preferably, the inner layer of the metallic enclosure is a metal foil and the outer layer is a metal wire fabric.

6 Claims, 1 Drawing Sheet

FLAME-RESISTANT CABLE SLEEVE

FIELD OF THE INVENTION

The present invention relates to a flame-resistant sleeve for covering joints or splices in electrical transmission cables.

Plastic cable sleeves, particularly for use with communication and power transmission cables, are well known. Such plastic sleeves exhibit good mechanical, chemical, electrical, and weatherproof properties and are economical to produce having well known manufacturing and processing advantages. Polyolefins have been found to be particularly advantageous materials for making such sleeves. However, such plastic cable sleeves are easily destroyed by the action of external flames.

SUMMARY AND OBJECTS OF THE INVENTION

It is an object of this invention to provide a cable sleeve for covering joints in communication and power transmission cables which resist destruction of the cable and joint when subjected to excess heat, i.e., flames.

The present invention provides a flame-resistant cable sleeve which comprises a flexible, non-flammable, metallic, multilayer, enclosure. The multilayer enclosure comprises a dense inner layer, preferably a metal foil, and a mechanically strong outer layer, preferably a metal wire screen. The multilayer cable sleeves of this invention provide a high degree of protection to the cables they cover when subjected to flames.

Preferred metal foils for forming the dense inner layer are copper and steel foil and especially, aluminum foil having a thickness of about 0.05 to 0.2 mm. The metal foil provides a flame barrier and prevents melted plastic from penetrating through the enclosure and being ignited outside the enclosure.

The preferred mechanically strong outer layer is a porous metal wire fabric, e.g., screen, which protects and secures the metal foil. The metal wire fabric simmultaneously secures the dense inner layer in place and protects the dense inner layer from mechanical stress produced by thermoplastic material and gases evolved when such materials are heated by external flames. Metal wire fabric of galvanized steel having a mesh width of about 0.25 mm is especially preferred.

The cable sleeves of the present invention may include a plastic sealing body having a surface covered with a metal foil, as described above. Preferably, the metal foil will be welded onto the plastic sealing body by means of a hot plunger.

DETAILED DESCRIPTION OF THE INVENTION

Figure 1:
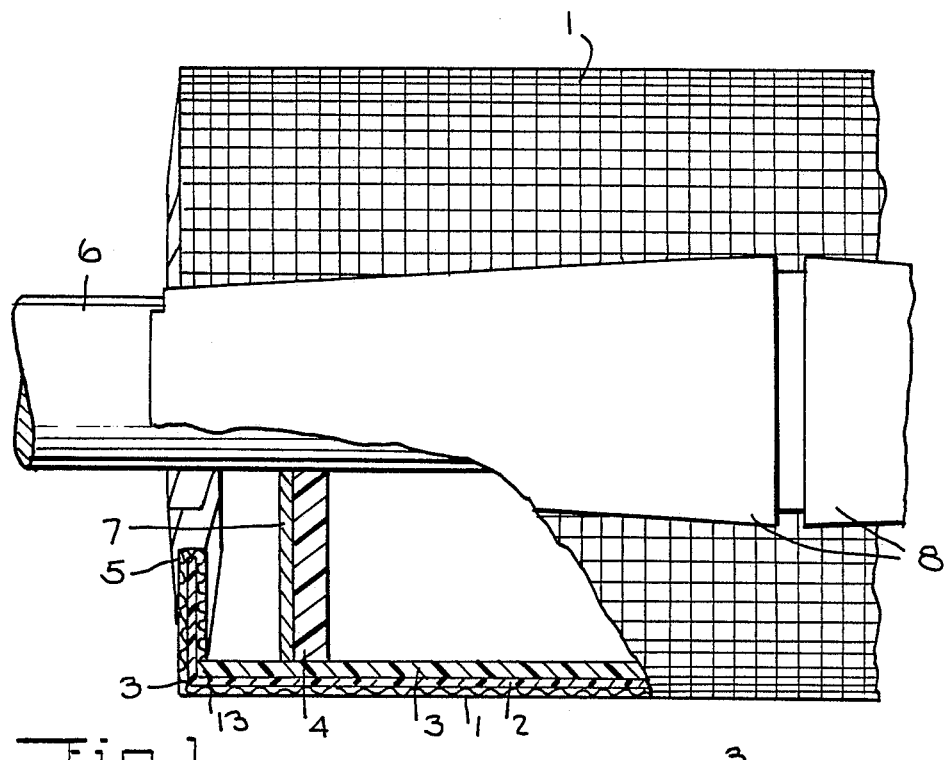
FIGS. 1 and 2 are sectional views of a cable sleeve constructed in accordance with the present invention having broken away portions.

According to the embodiment shown in FIG. 1, a cable 6 is inserted into a tubular thermoplastic cable sleeve 3 and attached thereto by washer-like body 4. The exterior surface of washer-like body 4 is covered with metal foil 7. The tubular cable sleeve 3 is open at both ends and enclosed by a flexible, metallic, multilayer enclosure. The multilayer enclosure comprises a metal foil 2 secured to the plastic cable sleeve 3 and a wire fabric 1 superposed on and secured to the metal foil 2. A wedge-shaped metal bar 8 serves for closing the cable sleeve 3 around cable 6. In order to protect end faces 13 of the plastic cable sleeve 3 against the action of flames, the wire fabric 1 with the metal foil 2 is drawn over the end face 13 in apron-fashion (see also FIG. 2). The apron 5 is folded to secure it in place. The wire fabric is folded inward about the edges of metal foil and thus surrounds a surface and edges of the metal foil 2 completely.

Figure 2:
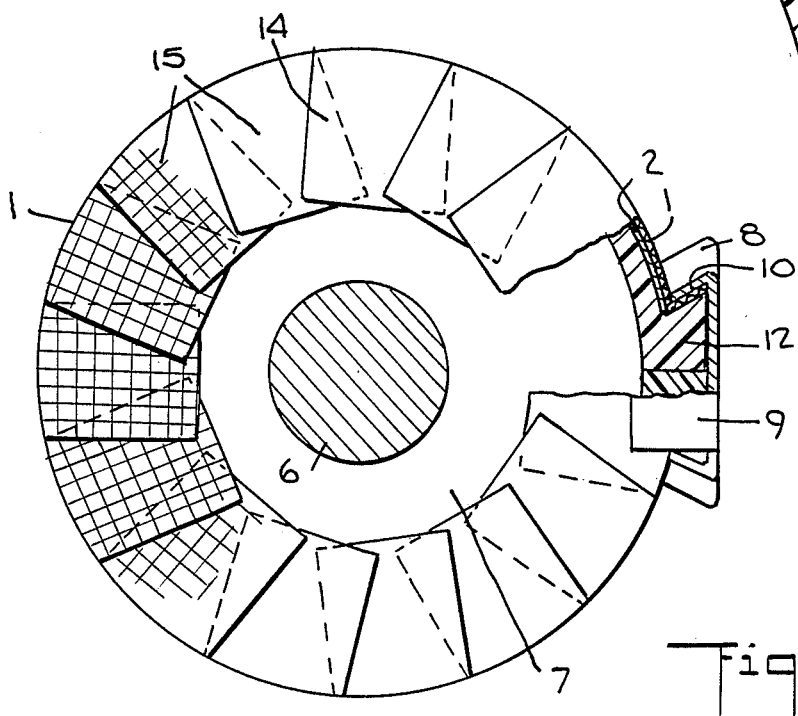

As shown in FIG. 2, the wire fabric 1 extends over the metal foil 2 in the sealing region 12 and is embedded in the wedge-shaped flank 10 by melting of the sealing body 3 with a heating plunger 11. A sealing apron 9 of the metal bar 8 protects the sealing body 3 at the end face 13 in the sealing region 12.

Figure 3:
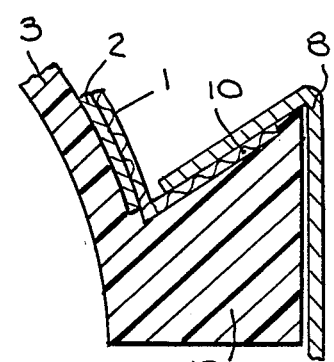
FIG. 3 is an enlarged section of the sealing region of the cable sleeve shown in FIGS. 1 and 2.

FIG. 3 illustrates a method for attaching wire fabric 1 to sealing body 3 wherein the wire fabric 1 is extended over the edge of metal foil 2 and welded into wedge-shaped flanges 10. Metal bar 8 slides over the wedge-shaped flanges 10 in sealing region 12 closing the cable sleeve around cable 6.

What is claimed is:

1. A flame-resistant cable sleeve, comprising: a tubular thermoplastic body open at both ends having an exterior surface covered with a metal foil layer and a wire fabric superposed on said metal foil layer;

a longitudinal opening in the tubular body for receiving a cable and means for sealing the opening;

a pair of washer-like bodies for securing the tubular body to a cable and sealing its open end; and said washer-like bodies having exterior surfaces covered with metal foil.

2. The flame-resistant cable sleeve according to claim 1, wherein the metal foil layer is aluminum.

3. The flame-resistant cable sleeve according to claim 1, wherein the metal layer foil has a thickness of about 0.05 to 0.2 mm.

4. The flame-resistant cable sleeve according to claim 2, wherein the metal layer foil has a thickness of about 0.05 to 0.2 mm.

5. The flame-resistant cable sleeve according to claim 2, wherein the wire fabric has a mesh width of about 0.25 mm.

6. The flame-resistant cable sleeve according to claim 1, wherein the metal foil layer is selected from the group consisting of copper and steel.